(12) United States Patent
Chiba (10) Patent No.: US 9,204,140 B2
(45) Date of Patent: Dec. 1, 2015

(54) DISPLAY DEVICE AND DISPLAY METHOD (71) Applicant: Sony Corporation, Tokyo (JP)

(72) Inventor: Atsuhiro Chiba, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/498,362

(22) Filed: Sep. 26, 2014

(65) Prior Publication Data

US 2015/0009308 A1      Jan. 8, 2015

Related U.S. Application Data

(63) Continuation of application No. 13/364,966, filed on Feb. 2, 2012, now Pat. No. 8,928,655.

(30) Foreign Application Priority Data

Feb. 14, 2011 (JP) ................... 2011-029064

(51) Int. Cl.
*G06T 15/00* (2011.01)
*H04N 13/04* (2006.01)

(52) U.S. Cl.
CPC ....... *H04N 13/0486* (2013.01); *H04N 13/0413* (2013.01); *H04N 13/0468* (2013.01); *H04N 2213/007* (2013.01)

(58) Field of Classification Search
CPC .............. H04N 13/00; H04N 13/0413; H04N 13/0468; H04N 13/0207
See application file for complete search history.

(56) References Cited

U.S. PATENT DOCUMENTS

| 7,245,430 | B2 | 7/2007 | Kobayashi et al. | |
|---|---|---|---|---|
| 8,760,761 | B2 | 6/2014 | Uehara | |
| 2006/0146046 | A1* | 7/2006 | Longhurst et al. | ............ 345/418 |
| 2011/0316881 | A1 | 12/2011 | Yoshifuji et al. | |
| 2011/0316985 | A1 | 12/2011 | Ishikawa et al. | |

FOREIGN PATENT DOCUMENTS

| EP | 0833183 | | 4/1998 |
|---|---|---|---|
| EP | 1174167 | A2 * | 1/2002 |
| JP | 07-038926 | | 2/1995 |
| JP | 09-197344 | | 7/1997 |
| JP | 2001-095014 | | 4/2001 |
| JP | 2001-166259 | | 6/2001 |
| JP | 2004-282217 | | 10/2004 |
| JP | 2008-134277 | | 6/2008 |
| WO | 2008/003373 | | 1/2008 |

OTHER PUBLICATIONS

Japanese Office Action issued Sep. 9, 2014 in corresponding Japanese Application No. 2011-029064.
European Search Report issued Jul. 31, 2012 for corresponding European Application No. 12000184.7.

* cited by examiner

*Primary Examiner* — Huy T Nguyen
(74) *Attorney, Agent, or Firm* — K&L Gates LLP (57) ABSTRACT

A display device includes: a display unit displaying plural viewpoint images; a light separation unit having plural transmitting portions and separating light from the display unit; and a display control unit controlling the timing of switching either of display positions of respective viewpoint images on the display unit and transmittance of respective transmitting portions of the light separation unit based on correlation information of the viewpoint images between frames.

21 Claims, 8 Drawing Sheets

DISPLAY DEVICE AND DISPLAY METHOD

CROSS REFERENCES TO RELATED APPLICATIONS

The present application is a continuation of U.S. patent application Ser. No. 13/364,966 filed Feb. 2, 2012, which application claims priority to Japanese Priority Patent Application JP 2011-029064 filed in the Japan Patent Office on Feb. 14, 2011, the entire content of which is hereby incorporated by reference.

BACKGROUND

The present disclosure relates to a display device and a display method, and particularly relates to a display device and a display method capable of displaying plural viewpoint images.

In recent years, a naked-eye 3D display device (hereinafter, referred to as a display device) capable of viewing 3D video images by guiding light of viewpoint images different from each other to right and left eyes is becoming popular. The display device guides light of given viewpoint images in plural viewpoint images to the eyeballs of an observer by using a parallax barrier or lenticular lenses. In a display device 90 shown in FIG. 8, light of viewpoint images of viewpoints 5 and 6 in light rays transmitting through transmitting portions 905a of a parallax barrier 905 is guided to the left eye and the right eye of an observer respectively, which enables stereoscopic vision of an image.

Figure 8:
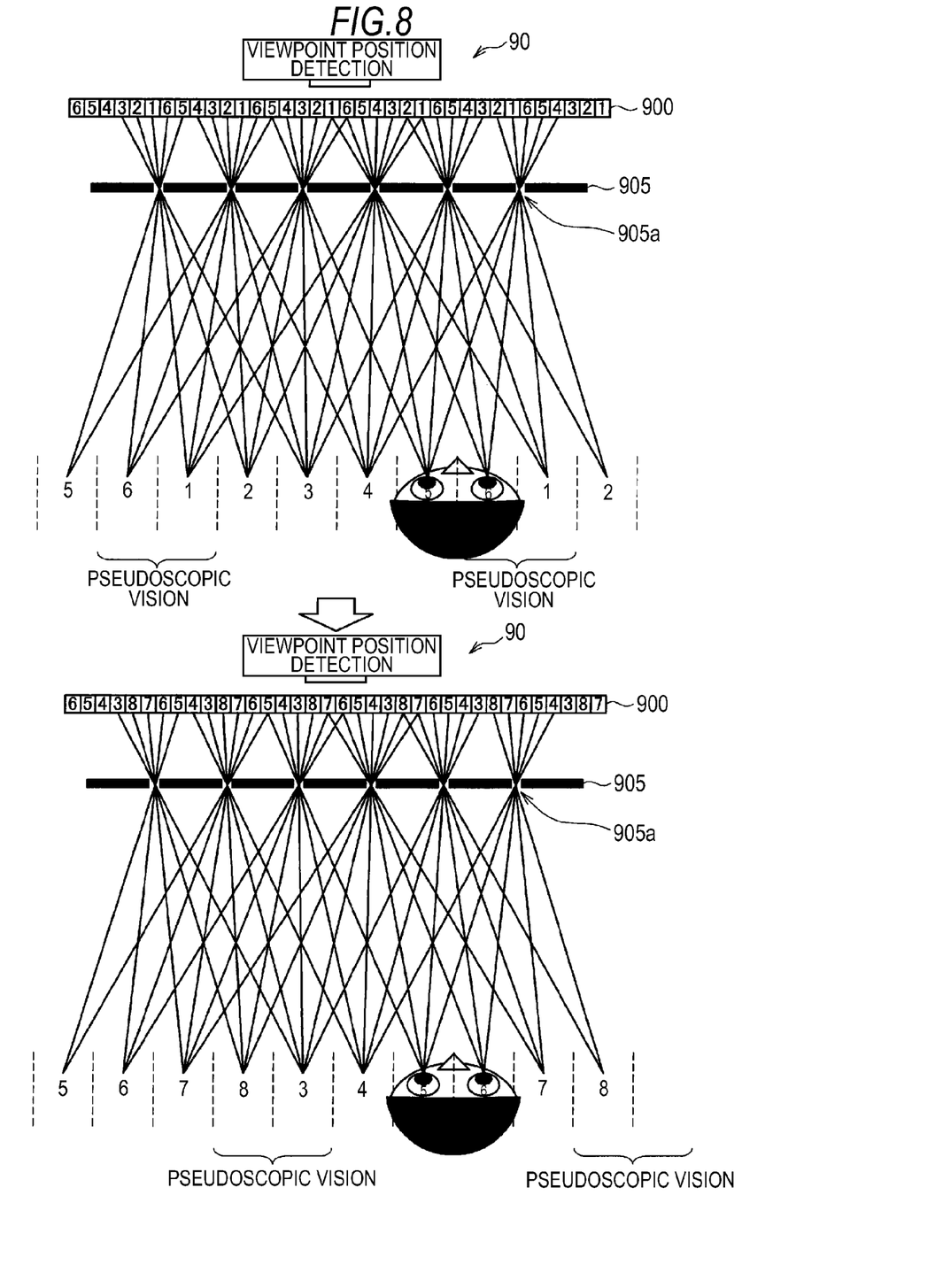
FIG. 8 is a view showing a comparative example of position switching of multi-viewpoint images.

In respective pixels on a display screen of a display unit 900, respective viewpoint images are cyclically arranged. Therefore, at a boundary point of respective cycles (for example, between a viewpoint 6 and a viewpoint 1 in the case of 6-viewpoints), a pseudoscopic phenomenon occurs, in which light of a viewpoint image which should enter the right eye is guided to the left eye, and light of a viewpoint image which should enter the left eye is guided to the right eye. In a pseudoscopic area, the observer perceives a video image in which the near side and the far side of a 3D image are inverted, or views a video image with a sense of discomfort in which these are fused unnaturally.

It is difficult to fundamentally solve the problem of the pseudoscopic phenomenon as it occurs based on the principle in naked-eye display devices. Accordingly, a technique of controlling a position of the observer so as not to enter the pseudoscopic area by detecting a position of the observer's face has been proposed. For example, in JP-A-2004-282217 (Patent Document 1) and JP-A-7-038926 (Patent Document 2), there is proposed a display method of switching display positions of multi-viewpoint images continuously so that the observer is not positioned in the pseudoscopic area when the observer is in the pseudoscopic area or comes close to the pseudoscopic area. For example, the viewpoint images of viewpoints 1 to 6 are displayed in the upper drawing in FIG. 8, whereas, the display positions of the multi-viewpoint images are switched from viewpoints 1 to 6→viewpoints 2 to 7→viewpoints 3 to 8 "continuously" so as to display viewpoint images of viewpoints 3 to 8 in the lower drawing, which allows the position of the observer in an orthoscopic area.

SUMMARY

However, in order to expand the orthoscopic area by the above method, it is necessary to input or generate considerably many viewpoint images, which increases the load in image processing.

The orthoscopic area can be expanded by increasing the number of viewpoints of an image to be displayed on a display screen. However, as the number of viewpoints of the image displayed on the display screen is increased, the resolution of the image is deteriorated. Therefore, image quality is reduced when the number of viewpoints is blindly increased for expanding the orthoscopic area.

In view of the above, it is desirable to provide a novel and improved display device and a display method capable of creating an environment where the observer can view images in good conditions in a display device displaying plural viewpoint images.

An embodiment of the present disclosure is directed to a display device including a display unit displaying plural viewpoint images, a light separation unit having plural transmitting portions and separating light from the display unit, and a display control unit controlling the timing of switching either of display positions of respective viewpoint images on the display unit and transmittance of respective transmitting portions of the light separation unit based on correlation information of the viewpoint images between frames.

The display control unit may control the switching timing based on a scene change of viewpoint images detected as correlation information of the viewpoint images between frames.

The display control unit may control the switching timing based on the size of a variation degree in viewpoint images detected as correlation information of the viewpoint images between frames.

The display control unit may acquire a position of an observer and may switch at least either of display positions of respective viewpoint images and transmittance of respective transmitting portions so that central images of the plural viewpoint images come close to the position of the observer at the switching timing.

The display control unit may acquire the position of the observer and may switch at least either of display positions of respective viewpoint images and transmittance of respective transmitting portions so that the central images of the plural viewpoint images are arranged at the position of the observer at the switching timing.

The display control unit may acquire the position of the observer and may switch at least either of display positions of respective viewpoint images and transmittance of respective transmitting portions so that the central images of the viewpoint images come close to the position of the observer in the case where the central images of the plural viewpoint images are not arranged at the position of the observer at the switching timing.

The display control unit may acquire the position of the observer and may switch at least either of display positions of respective viewpoint images and transmittance of respective transmitting portions in the case where the observer is in a pseudoscopic area at the switching timing.

The display control unit may acquire the position of the observer and may switch at least either of display positions of respective viewpoint images and transmittance of respective transmitting portions in the case where the observer is in the pseudoscopic area or in a quasi-orthoscopic area adjacent to the pseudoscopic area at the switching timing.

The display control unit may acquire the position of the observer and may not switch at least either of display positions of respective viewpoint images and transmittance of respective transmitting portions in the case where the observer is in an orthoscopic area at the switching timing.

The display control unit may not switch at least either of display positions of respective viewpoint images and transmittance of respective transmitting portions in the case where a variation of the position of the observer is lower than a given threshold value.

The display control unit may acquire positions of plural observers and may switch at least either of display positions of respective viewpoint images and transmittance of respective transmitting portions at the switching timing in the case where all plural observers can view the images in the orthoscopic area after the switching.

Another embodiment of the present disclosure is directed to a display method including acquiring correlation information of plural viewpoint images between frames displayed on a display unit and controlling the timing of switching at least either of display positions of respective viewpoint images on the display unit and transmittance of respective transmitting portions of a light separation unit including plural transmitting portions separating light from the display unit based on the acquired correlation information of the viewpoint images between frames.

According to the embodiments of the present disclosure, it is possible to create an environment where the observer can view images in good conditions in the display device displaying plural viewpoint images.

Additional features and advantages are described herein, and will be apparent from the following Detailed Description and the figures.

DETAILED DESCRIPTION

Hereinafter, respective embodiments of the present disclosure will be explained in detail with reference to the attached drawings. In the present specification and the drawings, the same numerals and signs are given to components having substantially the same functional configurations to thereby omit repeated explanation.

The embodiments of the present disclosure will be explained in the following order.
 <Embodiment>
 [Outline Configuration of Display Device]
 [Functional Configuration of Display Device]
 [Operations of Display Device]
 <Modification Example 1>
 [Operations of Display Device]
 <Modification Example 2>
 [Operations of Display Device]

Embodiment

Outline Configuration of Display Device

Figure 1:
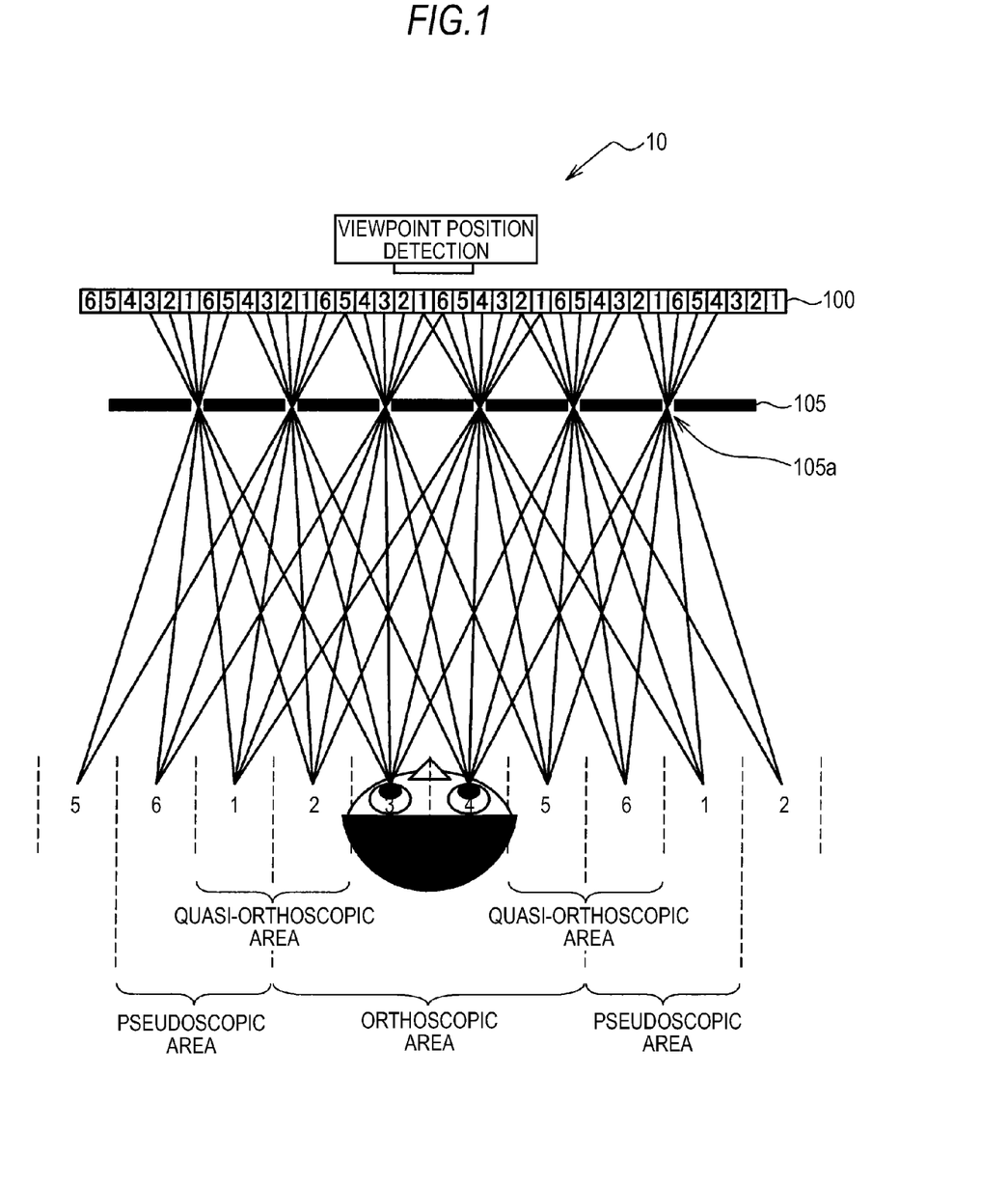
FIG. 1 is an outline configuration view of a display device according to an embodiment of the present disclosure.
Figure 2:
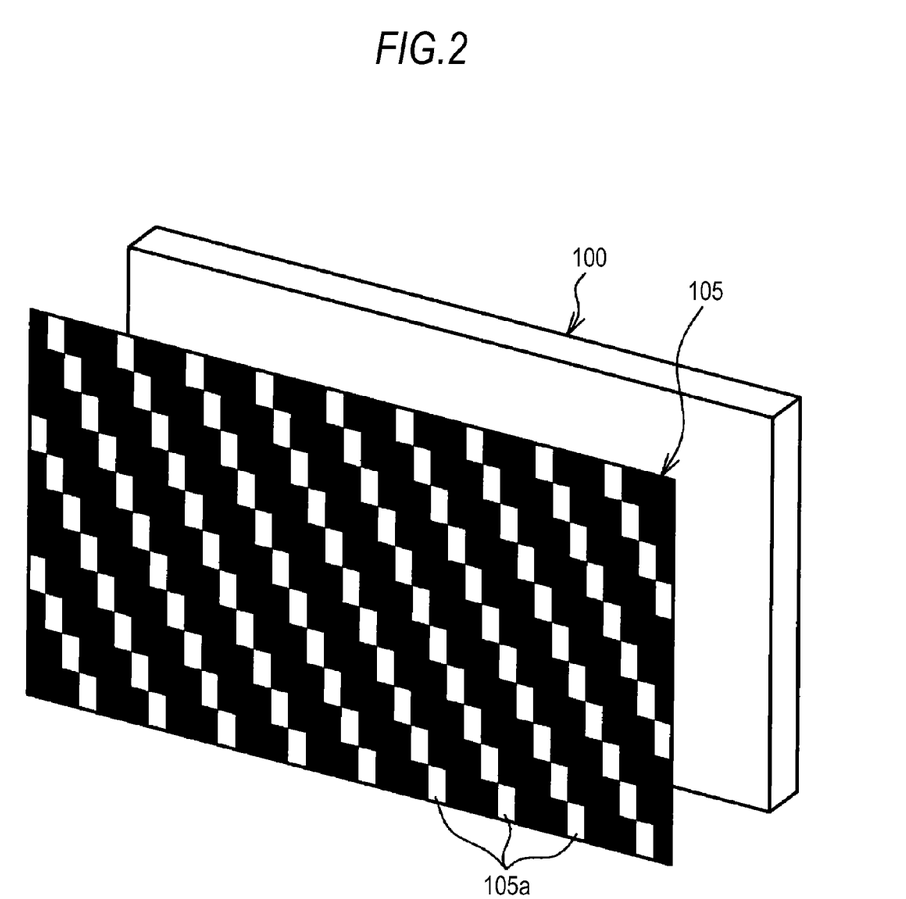
FIG. 2 is an outline configuration view of a 3D display and a parallax barrier according to the embodiment.

First, an outline configuration of a display device according to an embodiment of the present disclosure will be explained. As shown in FIG. 1 and FIG. 2, a display device 10 according the embodiment includes a display unit 100 and a parallax barrier 105 to display stereoscopic images. The display unit 100 displays plural viewpoint images. In the present embodiment, viewpoint images of 6 viewpoints are cyclically arranged on the display unit 100. The parallax barrier 105 separates right-eye images and left-eye images from respective viewpoint images. As shown in FIG. 2, the parallax barrier 105 includes plural transmitting portions 105a, separating light from the display unit 100 by changing transmittance of respective transmitting portions 105a.

The display unit 100 may be a display such as a LCD (Liquid Crystal Display), a PDP (Plasma Display Panel) or an organic EL (Electro-Luminescence) panel.

The parallax barrier 105 is an example of a light separation unit separating light from the display unit 100. As another example of the light separation unit, parallax devices such as a lenticular lens can be cited. Passive devices fixed to a 3D mode and active devices which can be switched between 2D and 3D can be considered as parallax devices, but the configuration is not limited to the above in the embodiment. Additionally, the parallax barrier 105 is placed in front of a pixel surface of the display device 100 in the embodiment, however, the position is not limited to this when the display unit is in a non-self luminous type unit and it is also preferable that the parallax barrier 105 is placed at the back of the display unit 100.

In the embodiment, the observer views respective viewpoint images through the parallax barrier 105 as shown in FIG. 1, therefore, only the right-eye image enters the right eye and only the left-eye image enters the left eye in an orthoscopic area. A video image seen by the right eye and a video image seen by the left eye differ as described above, video images displayed on a 3D display unit 100a will be stereoscopic.

When the number of viewpoints is "6", six viewpoint images are cyclically arranged at positions of respective pixels of the display unit 100. The parallax barrier 105 in front of the display unit 100 spatially separates the viewpoint images of 6-viewpoints respectively by the transmitting portions 105a. In FIG. 1, the observer observes a right-eye viewpoint image of a viewpoint "4" by the right eye and observes a left-eye viewpoint image of a viewpoint "3" by the left eye. In this case, the observer observes the viewpoint images of the viewpoints "3" and "4" corresponding to central images of viewpoints images of 6-viewpoints, therefore, the observer is positioned at the best position where is farthest from a pseudoscopic area. As described above, the observer is at the position where the central images are seen in the initial position.

(Pseudoscopic Area/Quasi-Orthoscopic Area)

As described above, when the viewpoint images are cyclically arranged, the pseudoscopic area exists at a boundary point of respective cycles, in which light of the viewpoint image which should enter the right eye is guided to the left eye and light of the viewpoint image which should enter the left eye is guided to the right eye. It is not unfavorable as the observer views uncomfortable video images in the pseudoscopic area.

In order to avoid the viewing in the pseudoscopic area, for example, it is possible to consider a method of switching display positions of multi-viewpoint images "continuously" so that the observer's position is in an orthoscopic area when the observer is in the pseudoscopic area or comes close to the pseudoscopic area as shown in an upper drawing of FIG. 8. The viewpoint images of viewpoints 1 to 6 are displayed in the upper drawing of FIG. 8, whereas the display positions of the multi-viewpoint images are switched from viewpoints 1 to 6→viewpoints 2 to 7→viewpoints 3 to 8 "continuously" so as to display viewpoint images of viewpoints 3 to 8 in a lower drawing of FIG. 8.

As described above, in order to shift the orthoscopic area, it is necessary to prepare considerably many viewpoint images by inputting or generating images. However, the amount of image processing is large and the processing load is increased when preparing many viewpoint images. Accordingly, a method of creating an environment where the observer can view images in good conditions in a display device displaying plural viewpoint images in the present embodiment explained below.

Areas other than the pseudoscopic areas are the orthoscopic areas, however, areas extending over both the pseudoscopic area and the orthoscopic area are referred to also as quasi-orthoscopic areas. For example, areas where the viewpoint images of viewpoints 6 and 1 are the pseudoscopic areas in FIG. 1. On the other hand, areas on both sides of the pseudoscopic area, namely, areas where viewpoint images are viewpoints 5 and 6, as well as areas where viewpoint images are viewpoints 1 and 2 are the quasi-orthoscopic areas. However, the quasi-orthoscopic areas are not limited to them and it is also preferable to set more areas as the quasi-orthoscopic areas or it is also preferable not to set the quasi-orthoscopic area.

[Functional Configuration of Display Device]

Figure 3:
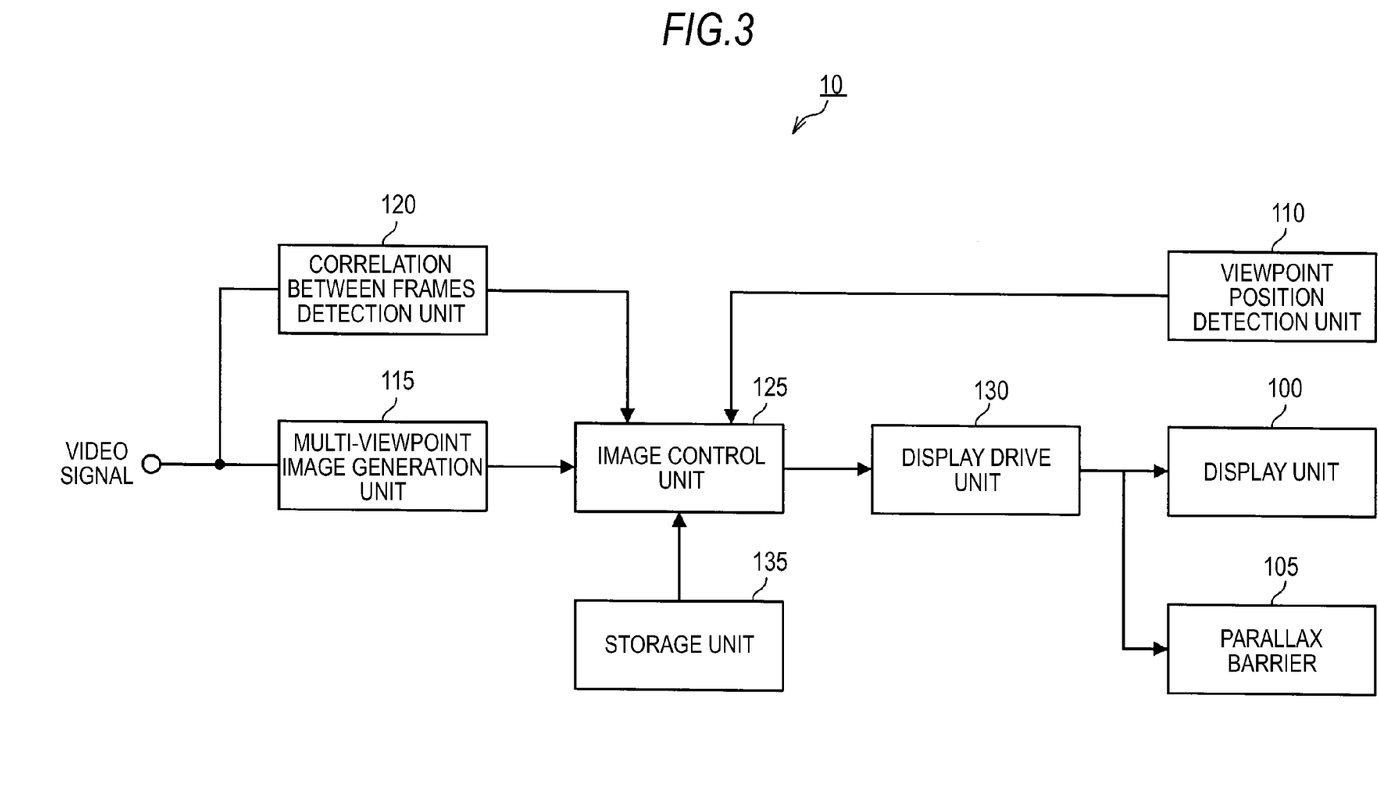
FIG. 3 is a functional configuration diagram of the display device according to the embodiment.

A functional configuration of the display device 10 according to the embodiment will be explained with reference to FIG. 3. The display device 10 according to the embodiment includes the display unit 100, the parallax barrier 105, a viewpoint position detection unit 110, a multi-viewpoint image generation unit 115, a correlation between frames detection unit 120, an image control unit 125, a display drive unit 130 and a storage unit 135. The explanations for the display unit 100 and the parallax barrier 105 are omitted here as having been described above, and other functional units will be explained.

The viewpoint position detection unit 110 images the observer by using a not-shown camera and recognizes the face of the observer based on an obtained image. As there exist commercially available digital-still cameras having a function of detecting faces and focusing on them, existing techniques of face detection can be used. Existing techniques of face recognition can be also used, in which the imaged face is identified by comparing the image with a template. In the embodiment, various well-known face recognition techniques can be used. As specifications of the camera, a camera such as Web camera which can image moving images can be used. Two or more cameras are generally necessary for measuring the distance, however, distance information can be acquired by an object recognition technique by one camera.

The viewpoint position detection unit 110 detects a direction where the observer exists from image data imaged as described above by the face detection function. The viewpoint position detection unit 110 calculates a position and a distance of the observer from the recognized face of the observer. When there are plural observers, the viewpoint position detection unit 110 calculates positions and distances with respect to all observers. Two method of measuring distances performed by the viewpoint position detection unit 110 can be mainly considered as follows.

As one of the distance measuring methods, the observer moves to a certain fixed position (for example, a position 2 m apart from the center of the screen) and images the face by using the camera at the position. The size of a face image taken at the time is used as a reference. The imaging of a reference image is performed as an initial setting before viewing the content. More specifically, the viewpoint position detection unit 110 previously checks average sizes of the face on the image with respect to sight distances and records the sizes in the storage unit 135. The size of the detected face image of the observer is compared with data stored in the storage unit 135 and corresponding distance data is read out, thereby acquiring positional information of the observer and distance information from the display unit 100 to the observer. The viewpoint position detection unit 110 may use face tracking using the face detection function for detecting the position of the observer, and may also use, for example, head tracking and eye tracking, in addition to the face tracking.

As another one of the distance measuring methods, it is possible to detect the right and left eyes of the observer by the above face recognition function. The distance between respective barycentric positions of the right and left eyes imaged by the camera is detected. Generally, there is a design sight distance in a naked-eye 3D display device. A distance between human pupils (distance between eyes) is said to be 65 mm on the average. The viewpoint position detection unit 110 calculates the distance to the observer based on the calculated distance between the barycentric positions of the right and left eyes at the time of face recognition operation by using the case where the observer having the distance between pupils of which is 65 mm is apart from the camera by the "design sight distance" as a reference.

The multi-viewpoint image generation unit 115 inputs or generates plural viewpoint images. In the embodiment, viewpoint images of 6-viewpoints are inputted or the viewpoint images of 6-viewpoints are generated from the inputted images.

The correlation between frames detection unit 120 detects correlation information of viewpoint images between frames and outputs the information to the image control unit 125. As an example of correlation information viewpoint images between frames, scene change of viewpoint images can be cited. In this case, the viewpoint images are switched when the scene change of viewpoint images is detected.

A scene means a image section (image clip) of a batch of images which are spatially continued, and the scene change means, for example, a switching point of scenes, namely, a change point of images which is a boundary where the image clips which are not continued temporally or spatially are connected. The scene change is also referred to as a cut change, a shot change, an image changing point. The scene change is applied in the specification.

For example, the correlation between frames detection unit 120 may detect the scene change when luminance of images between frames is largely changed as the scene change. The correlation between frames detection unit 120 may also detect the scene change from change of color balance in images between frames, change of colors in images between frames, appearance of a telop in images between frames and so on.

Various well-known techniques can be used for detection of the scene change executed by the correlation between frames detection unit 120. As an example of methods of detecting the scene change, a statistic difference method, an image difference method, a coding data method, an edge method, a histogram difference method and so on can be cited.

For example, a given scene change can be detected by the difference between given frames of DC coefficient of DCT (discrete cosine transform), the difference in the data amount of a given histogram in MPEG, as well as the difference between frames of the data amount of a given histogram of luminance signals or color signals of images in a baseband. Moreover, it is possible to detect slow scene changes such as fade in/out or wipe out by given signal processing performed by using characteristics in which the edge amount in images changes. As described above, the scene change detection includes detection of cutting change by switching scenes on the images, scene changes by dissolve, fade in/out or wipe out on the images and so on by using the above techniques. It is also preferable to detect the scene change by detecting information of chapter points buried in the acquired image in advance.

As another example of correlation information of viewpoint images between frames, the size of a variation degree in viewpoint images is cited. In this case, when the variation degree of viewpoint images is higher than a predetermined threshold value, the viewpoint image is changed. For example, a case where the camera is moved in a certain direction without the scene change such as a camera work and a case where the whole viewpoint image changes without the change in cutting of the camera such as zoom-in or zoom-out will be detection targets.

As a method of detecting the size of the variation degree, for example, motion vectors can be used for estimating the size of the variation degree in viewpoint images. It is also preferable to detect the size of the variation degree in viewpoint images from movement or deformation of an imaging target in the image, change between appearance/disappearance of an object moving at high speed and so on. It is further preferable to detect the size of the variation degree in viewpoint images by acquiring information such as a camera aperture from the camera's side. The correlation of viewpoint images between frames described above includes not only correlation in moving images but also correlation between still images.

The image control unit 125 performs control to display viewpoint images generated by the multi-viewpoint image generation unit 115 in the initial position of FIG. 1. For example, in the case where the display device 10 is a television, the viewpoint position is detected and the central images of the multi-viewpoint images are provided to the observer when a 3D mode of the television is switched on or the power of the 3D television is turned on.

The image control unit 125 controls the timing of switching at least either of display positions of respective viewpoint images on the display unit 100 and transmittance of respective transmitting portions of the parallax barrier 105 based on correlation information of viewpoint images between frames. The image control unit 125 switches at least either of the display positions of the display unit 100 and the transmittance of plural transmitting portions 105a of the parallax barrier 105 so that the central images are displayed at the position of the eyes of the observer at the switching timing. For example, the display control unit 125 performs the switching control even when correlation information of viewpoint images between frames is low. The case where the correlation information of viewpoint images between frames is low is a case where the scene change of viewpoint images is detected, a case where the variation degree in viewpoint images is larger than a given size.

The display control unit 125 may acquire the position of the observer and may switch at least either of display positions of respective viewpoint images and transmittance of respective transmitting portions so that the central images of generated viewpoint images come close to the position of the observer at the switching timing.

The display control unit 125 may acquire the position of the observer and may switch at least either of display positions of respective viewpoint images and transmittance of respective transmitting portions so that the central images of generated viewpoint images are arranged at the position of the observer at the switching timing.

The display control unit 125 may acquire the position of the observer and may switch at least either of display positions of respective viewpoint images and transmittance of respective transmitting portions so that the central images of the viewpoint images come close to the position of the observer in the case where the central images of generated viewpoint images are not arranged at the position of the observer at the switching timing.

The display control unit 125 may acquire the position of the observer and may switch at least either of display positions of respective viewpoint images and transmittance of respective transmitting portions in the case where the observer is in the pseudoscopic area at the switching timing.

The display control unit 125 may acquire the position of the observer and may switch at least either of display positions of respective viewpoint images and transmittance of respective transmitting portions in the case where the observer is in the pseudoscopic area or in the quasi-orthoscopic area adjacent to the pseudoscopic area at the switching timing.

It is possible that the display control unit 125 acquires the position of the observer and does not switch at least either of display positions of respective viewpoint images and transmittance of respective transmitting portions in the case where the observer is in the orthoscopic area at the switching timing.

It is also possible that the display control unit 125 does not switch at least either of display positions of respective viewpoint images and transmittance of respective transmitting portions in the case where a variation of the position of the observer is lower than a given threshold value.

The display control unit 125 may acquire positions of plural observers and may switch at least either of display positions of respective viewpoint images and transmittance of respective transmitting portions so that the central images come close to positions of respective observers at the switching timing in the case where all plural observers can view the images in the orthoscopic area after the switching.

To switch display positions of respective viewpoint images is to switch pixels taking charge of respective viewpoint images to be displayed. Additionally, to switch variable transmittance of respective transmitting portions of the parallax barrier is to control the transmittance level of respective transmitting portions 105a according to the magnitude of voltage to be applied on electrodes arranged on the barrier, and it is also preferable to change a physical position of the parallax barrier.

The display control unit 130 electrically or physically drives the display unit 100 and the parallax barrier 105 respectively by the above method.

The storage unit 135 stores programs and various data for realizing functions of respective units such as the image control unit 125.

The display device 10 can be, for example, a television, a PC, mobile apparatuses and so on, and it is not always necessary to include the display unit 100 in the same casing. For example, the display unit 100 can be integrated with the display device 10 and provided on the surface thereof, or can be provided independent of the display unit 10. It is also not always necessary that the display unit 10 includes all of the above respective components in the same casing. For example, it is preferable that the storage unit 135 is not included in the display device 10 and the function thereof is provided, for example, by storage on a network.

The display device 10 has a computing processing unit performing various computing for displaying the image at an appropriate position, which can be realized by, for example, a GPU (Graphics Processing Unit), a CPU (Central Processing Unit), a DSP (Digital Signal Processor) and the like. Respective units of the display unit 10 may be operated in accordance with programs stored in the storage unit 135.

[Operations of Display Device]

Figure 4:
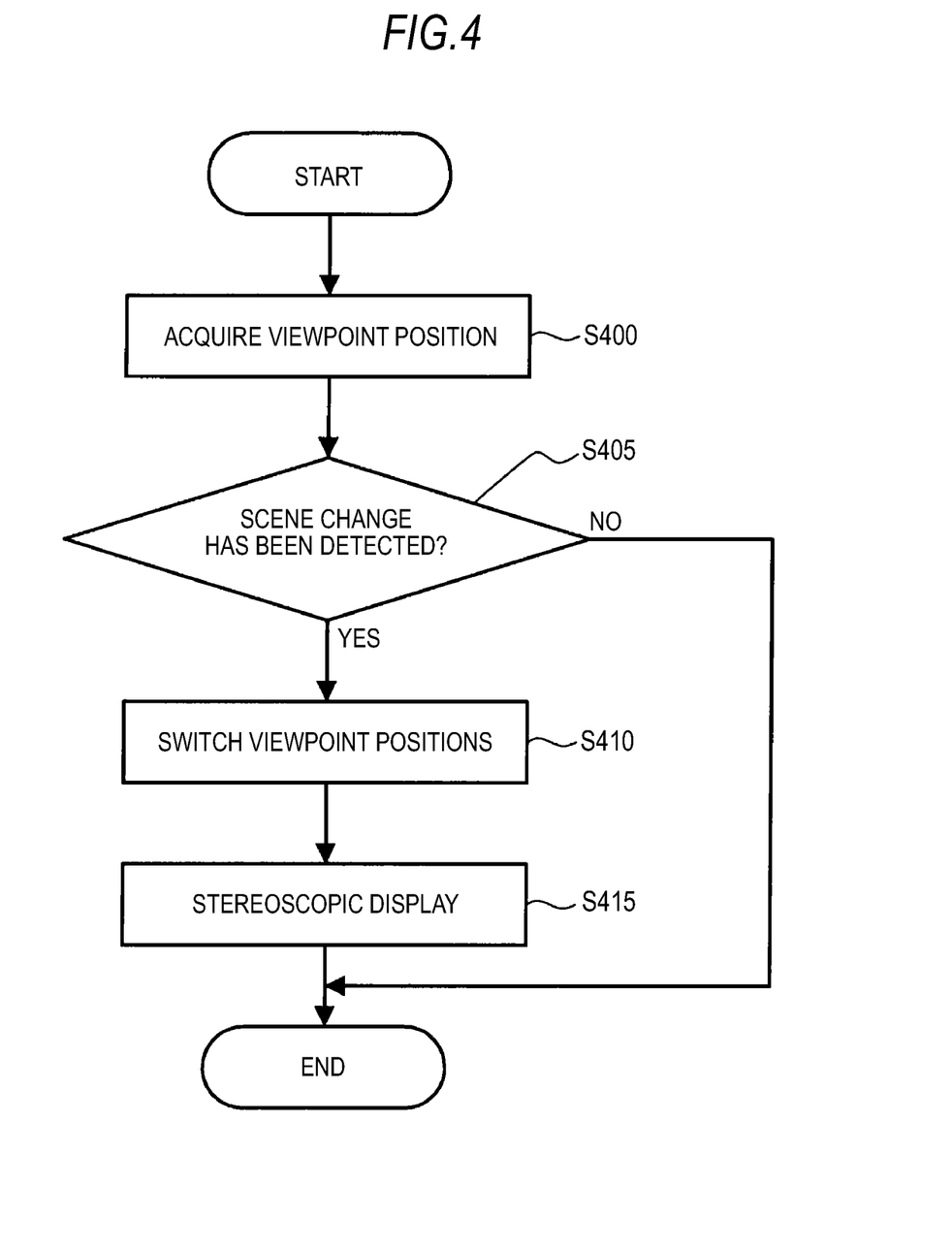
FIG. 4 is a chart showing a processing flow of switching positions of multi-viewpoint images according to the embodiment.

Next, operations of the display device 10 according to the embodiment will be explained with reference to a flowchart of FIG. 4. When the processing is started in FIG. 4, in Step S400, the viewpoint position detection unit 110 allows the camera to image a viewing environment and detecting a face in an imaging space to detect the position of the observer in the observer's space. Next, in Step S405, the image control unit 125 determines whether the scene change has been detected. The detection of the scene change is an example of information indicating correlation relation of images between frames as described above.

In Step S405, when it is determined that the scene change has not been detected, the process ends. On the other hand, when it is determined that the scene change has been detected in Step S405, the process proceeds to Step S410, and the display control unit 125 switches at least either of the display positions of respective viewpoint images and the transmittance of respective transmitting portions so that the central images of viewpoint images are arranged at the position of the observer. Then, in Step S415, the display control unit 125 displays respective viewpoint images so that the central images of viewpoint images are arranged at the position of the observer and the process ends.

Figure 6:
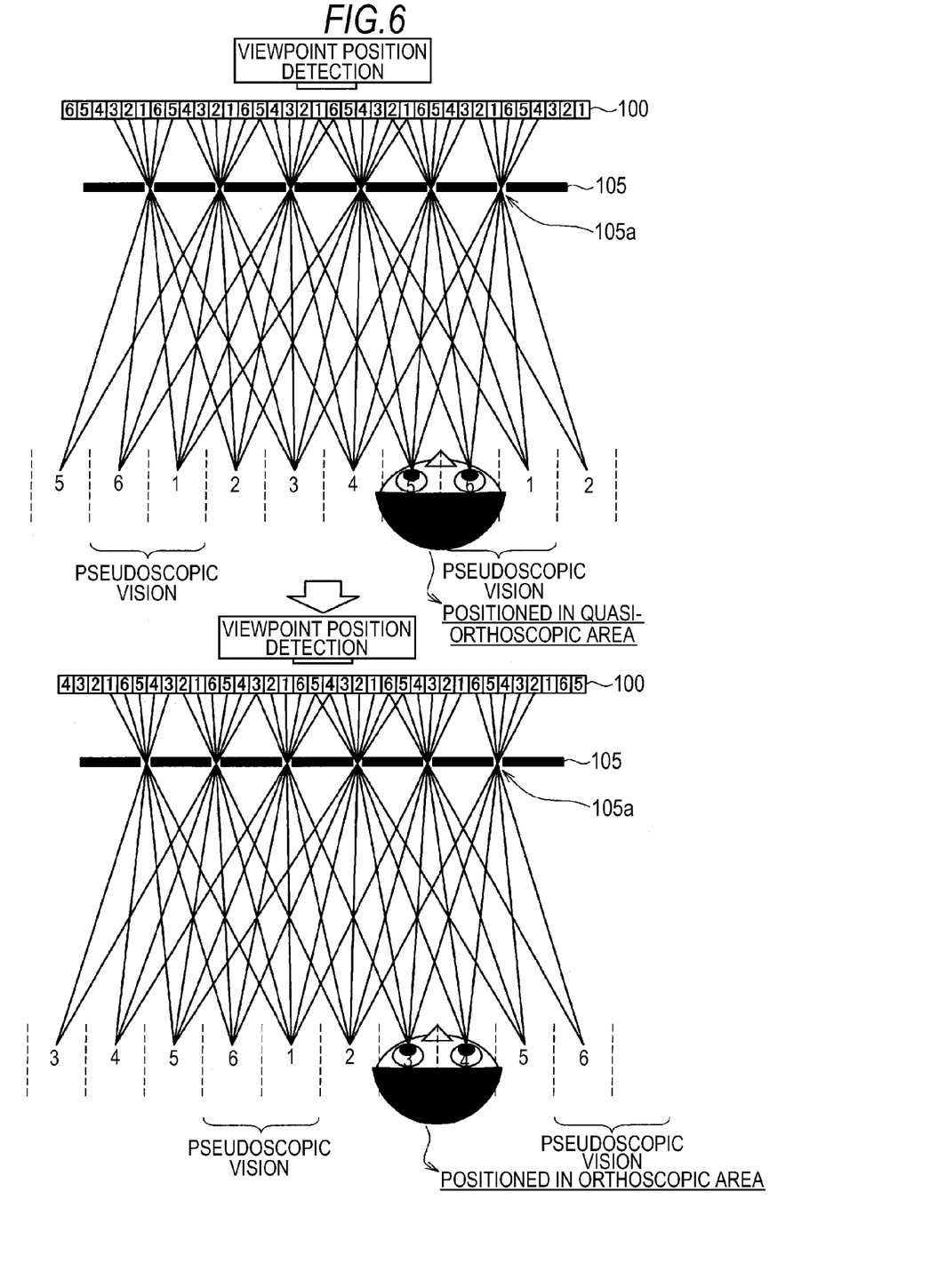
FIG. 6 is a view for explaining effects according to the modification example 1.

As explained above, when applying the display device 10 according to the embodiment, it is possible to switch multi-viewpoint images to be displayed so that the central images of the multi-viewpoint images (for example, images of viewpoints 3 and 4 in the case of 6-viewpoints) are arranged at the viewing position of the observer at the timing when images to be displayed are changed (refer to FIG. 6). Accordingly, it is possible to switch the display positions of viewpoint images without giving a sense of discomfort to the observer during viewing of images by matching the detection of the scene change to the switching timing. As a result, the observer can continuously view good images in the orthoscopic area without a sense of discomfort. The observer can view images in the orthoscopic area even at areas other than the center of the display screen. Accordingly, it is possible to provide the observer with a comfortable viewing environment of 3D video images.

Also in the embodiment, viewpoint images are switched so that the central images of multi-viewpoint images are arranged at the viewing position of the observer. Accordingly, it is not necessary to prepare a large number of multi-view images generated by image processing or imaged by the camera, which reduces the processing load. It is preferable that the images are switched so that the central images of multi-view images are arranged at the viewing position of the observer as described above, however, the present disclosure is not limited to the above, and it is also preferable that the arrangement of respective viewpoint images is switched so that the central images of viewpoint images come close to the position of the observer.

Modification Example 1

Operations of Display Device

Figure 5:
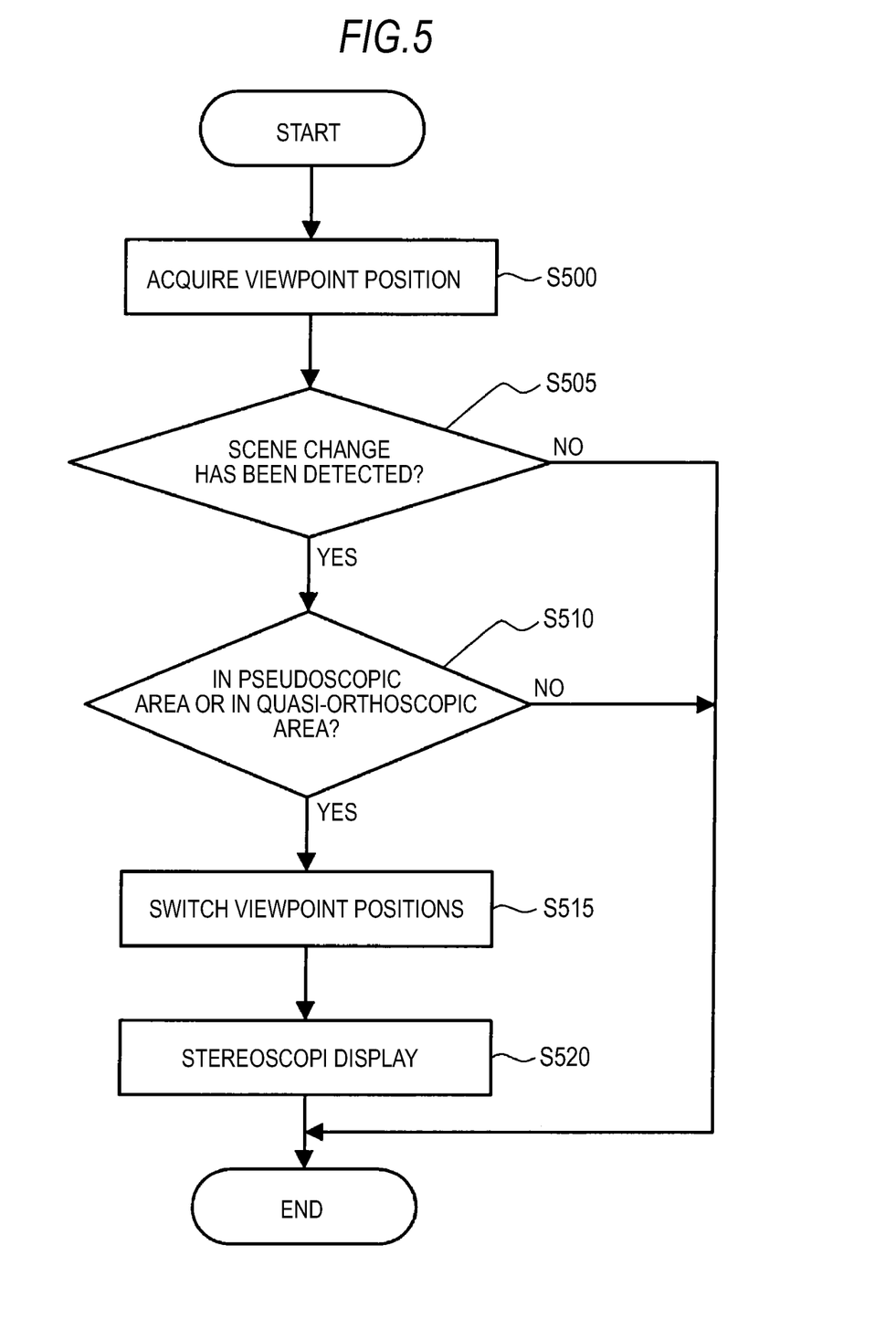
FIG. 5 is a chart showing a processing flow of switching positions of multi-viewpoint images according to a modification example 1 of the embodiment.

Next, operations of the display device 10 according to a modification example 1 will be explained with reference to a flowchart of FIG. 5. When the processing is started in FIG. 5, in Step S500, the viewpoint position detection unit 110 detects the position of the observer in the observer's space. Next, in Step S505, the image control unit 125 determines whether the scene change has been detected.

In Step S505, when it is determined that the scene change has not been detected, the process ends. On the other hand, when it is determined that the scene change has been detected in Step S505, the process proceeds to Step S510, and the display control unit 125 determines whether the observer is in the pseudoscopic area or in the quasi-orthoscopic area. As shown in FIG. 1, the quasi-orthoscopic area is an area close to the pseudoscopic area. In this case, viewpoints 5 and 6 as well as viewpoints 1 and 2 are the quasi-orthoscopic areas, however, the areas are not limited to them, and for example, viewpoints 4 and 5 as well as viewpoints 2 and 3 can be included in the quasi-orthoscopic area, in addition to the areas of viewpoints 5 and 6 as well as viewpoints 1 and 2.

When it is determined that the observer is not in the pseudoscopic area or in the quasi-orthoscopic area in Step S510, the process ends. On the other hand, when it is determined that the observer is in the pseudoscopic area or in the quasi-orthoscopic area in Step S510, the process proceeds to Step S515, and the display control unit 125 switches at least either of display positions of respective viewpoint images and transmittance of respective transmitting portions so that the central images of viewpoint images are arranged at the position of the observer. Then, in Step S520, the display control unit 125 displays respective viewpoint images so that the central images of viewpoint images are arranged at the position of the observer and the process ends. For example, when the observer is in the quasi-orthoscopic area as shown in the upper drawing of FIG. 6, the central images of viewpoints 3 and 4 are arranged at the position of the observer as shown in the lower drawing at the timing when the scene of images is changed. Therefore, the observer can avoid viewing in the pseudoscopic area without changing the viewing position.

As described above, when applying the display device 10 according to the embodiment, the multi-viewpoint images to be displayed are switched so that the central images of multi-viewpoint images (for example, images of viewpoints 3 and 4 in the case of 6-viewpoints) are arranged at the viewing position of the observer at the timing when the scene of images to be displayed is changed. The detection of the scene change is matched to the switching timing as described above, thereby switching the display position of the viewpoint images without giving a sense of discomfort to the observer during viewing images. Particularly, the switching is not performed when the observer is in the orthoscopic area in the present modification example, thereby avoiding frequent occurrence of switching of images.

Modification Example 2

Operations of Display Device

Next, operations of the display device 10 according to a modification example 2 will be explained with reference to a flowchart of FIG. 7. Assume that plural observers are viewing images in the modification example 2.

Figure 7:
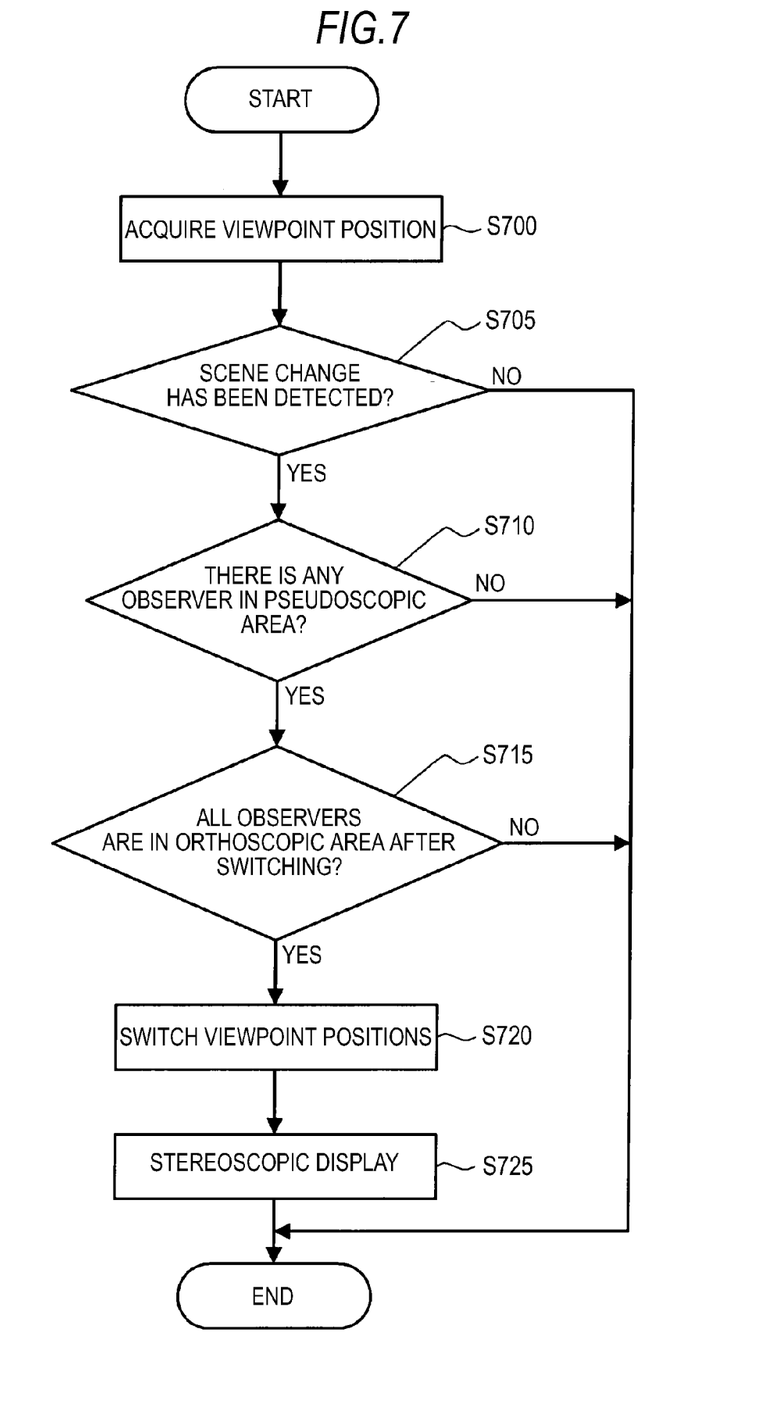
FIG. 7 is a chart showing a processing flow of switching positions of multi-viewpoint images according to a modification example 2 of the embodiment.

When the processing is started in FIG. 7, in Step S700, the viewpoint position detection unit 110 detects the position of the observer and determines whether the scene change has been detected.

In Step S705, when it is determined that the scene change has not been detected, the process ends. On the other hand, when it is determined that the scene change has been detected in Step S705, the process proceeds to Step S710, and the display control unit 125 determines whether there is any observer in the pseudoscopic area. Though only the pseudoscopic area is the detection target in this example, it is also preferable to determine whether the observer is in the pseudoscopic area or in the quasi-orthoscopic area as in the modification example 1.

When it is determined that there is no observer in the pseudoscopic area in Step S710, the process ends. On the other hand, when it is determined that there is at least one observer in the pseudoscopic area in Step S710, the process proceeds to Step S715 and the display control unit 125 determines whether all observers are in the orthoscopic area after switching. When it is determined that there will be at least one observer in the pseudoscopic area after switching, the process ends. On the other hand, when it is determined that all observers will be in the orthoscopic area after switching in Step S715, the process proceeds to Step S720, and the display control unit 125 switches at least either of display positions of respective viewpoint images and transmittance of respective transmitting portions so that all observers are in the orthoscopic area. Then, the display control unit 125 displays respective viewpoint images so that all observers views images in the orthoscopic area in Step S725 and the process ends.

As described above, when applying the display device 10 according to the embodiment, multi-viewpoint images are switched at the timing when the scene of images to be displayed is changed so that as many observers as possible can view images in the orthoscopic area. The detection of the scene change is matched to the switching timing as described above, thereby switching the display positions of the viewpoint images without giving a sense of discomfort to all observers during viewing images.

In the above embodiment and modification examples, operations in respective units are correlated with one another, therefore, these operations can be substituted by a series of operations in consideration of the correlation. As a result, the embodiment of the display device can be an embodiment of a display method.

According to the embodiment and respective modification examples described above, it is possible to provide the display device 10 capable of creating the environment where the observer can view images in good conditions in the display device displaying plural viewpoint images.

The preferred embodiment of the present disclosure has been explained with reference to the attached drawing as the above, however, the present disclosure is not limited to the example. It is obvious that a person with an ordinary skill in the art to which the present disclosure belongs can reach various alternations and modifications within a scope of technical ideas described in the appended claims, which will naturally belong to the technical scope of the present disclosure.

For example, the case of 2-viewpoints between eyes has been explained in the above embodiment and modification examples, however, the present disclosure is not limited to this. The present disclosure can be applied to a case of 3-viewpoints between eyes. For example, sections close to the pseudoscopic areas are set as the quasi-orthoscopic areas also in the case of 3-viewpoints between eyes, and the images can be switched so that the central images are arranged at the position of the observer at the timing of scene change when the observer is in the pseudoscopic area or in the quasi-orthoscopic area. When the number of viewpoints is 7 in the case of 3-viewpoints between eyes, the central images correspond to images of viewpoints 3 and 5.

Also in the embodiment of the present disclosure, it is not necessary to switch images when the observer is in the quasi-orthoscopic area as long as the area is not the pseudoscopic area. For example, it is possible not to perform switching in cases of ±1 viewpoint or ±2 viewpoints from the pseudoscopic area.

It is also preferable to set a control condition in which the image switching is not performed when low correlation between frames is detected. For example, in the case where detected displacement of the viewing position of the observer is small, it is possible to control not to switch images even when low correlation between frames is detected. The case where the displacement of the viewing position is small indicates a case where displacement is within ±1 viewpoint or within ±2 viewpoints from the original position of the observer. Additionally, the case where the displacement of the viewing position is small indicates a case where displacement is within half of the generated multi-viewpoint images. When the generated multi-viewpoint images are 8-viewpoints, the displacement within ±2 viewpoints corresponds.

The spatial separation of right-eye and left-eye images is controlled by using lenticular-lenses or the parallax barrier in the embodiment of the present disclosure, however, any other mechanisms can be used as long as 3D video images can be viewed by naked eyes.

In the present specification, steps described in the flowcharts includes not only processes performed along the described order in time series but also processes executed in parallel or individually, not always processed in time series. It goes without saying that steps processed in time series can appropriately change the order if necessary.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
   a display unit configured to display plural viewpoint images; and
   a control unit,
   wherein the control unit is configured to control of switching display positions of respective viewpoint images in accordance with a position of an observer at a scene change of the viewpoint images, and
   wherein the display control unit is configured to switch display positions of respective viewpoint images so that central images of the plural viewpoint images come close to a position of an observer at the switching timing.

2. The display device according to claim 1,
   wherein the control unit is configured to switch display positions of respective viewpoint images so that the central images of the plural viewpoint images are arranged at the position of the observer at the switching timing.

3. The display device according to claim 2,
wherein the control unit is configured to switch display positions of respective viewpoint images so that the central images of the viewpoint images come close to the position of the observer in the case where the central images of the plural viewpoint images are not arranged at the position of the observer at the switching timing.

4. The display device according to claim 1,
wherein the control unit is configured to switch display positions of respective viewpoint images in the case where an observer is in a pseudoscopic area at the switching timing.

5. The display device according to claim 1,
wherein the control unit is configured to switch display positions of respective viewpoint images in the case where an observer is in the pseudoscopic area or in a quasi-orthoscopic area adjacent to the pseudoscopic area at the switching timing.

6. The display device according to claim 1,
wherein the control unit is configured to not switch display positions of respective viewpoint images in the case where an observer is in an orthoscopic area at the switching timing.

7. The display device according to claim 1,
wherein the control unit is configured to not switch display positions of respective viewpoint images in the case where a variation of a position of an observer is lower than a given threshold value.

8. The display device according to claim 1,
wherein the control unit is configured to switch display positions of respective viewpoint images at the switching timing in the case where all plural observers can view the images in the orthoscopic area after the switching.

9. A display device comprising:
a display unit configured to display plural viewpoint images; and
a control unit,
wherein the control unit is configured to control of switching display positions of respective viewpoint images in accordance with a position of an observer at a scene change of the viewpoint images, and
wherein the control unit is configured to switch display positions of respective viewpoint images in the case where an observer is in the pseudoscopic area or in a quasiorthoscopic area adjacent to the pseudoscopic area at the switching timing.

10. The display device according to claim 9,
wherein the control unit is configured to switch display positions of respective viewpoint images so that the central images of the plural viewpoint images are arranged at the position of the observer at the switching timing.

11. The display device according to claim 10,
wherein the control unit is configured to switch display positions of respective viewpoint images so that the central images of the viewpoint images come close to the position of the observer in the case where the central images of the plural viewpoint images are not arranged at the position of the observer at the switching timing.

12. The display device according to claim 9,
wherein the control unit is configured to switch display positions of respective viewpoint images in the case where an observer is in a pseudoscopic area at the switching timing.

13. The display device according to claim 9,
wherein the control unit is configured to not switch display positions of respective viewpoint images in the case where an observer is in an orthoscopic area at the switching timing.

14. The display device according to claim 9,
wherein the control unit is configured to not switch display positions of respective viewpoint images in the case where a variation of a position of an observer is lower than a given threshold value.

15. The display device according to claim 9,
wherein the control unit is configured to switch display positions of respective viewpoint images at the switching timing in the case where all plural observers can view the images in the orthoscopic area after the switching.

16. A display device comprising:
a display unit configured to display plural viewpoint images; and
a control unit,
wherein the control unit is configured to control of switching display positions of respective viewpoint images in accordance with a position of an observer at a scene change of the viewpoint images, and
wherein the control unit is configured to switch display positions of respective viewpoint images at the switching timing in the case where all plural observers can view the images in the orthoscopic area after the switching.

17. The display device according to claim 16,
wherein the control unit is configured to switch display positions of respective viewpoint images so that the central images of the plural viewpoint images are arranged at the position of the observer at the switching timing.

18. The display device according to claim 17,
wherein the control unit is configured to switch display positions of respective viewpoint images so that the central images of the viewpoint images come close to the position of the observer in the case where the central images of the plural viewpoint images are not arranged at the position of the observer at the switching timing.

19. The display device according to claim 16,
wherein the control unit is configured to not switch display positions of respective viewpoint images in the case where an observer is in an orthoscopic area at the switching timing.

20. The display device according to claim 16,
wherein the control unit is configured to not switch display positions of respective viewpoint images in the case where a variation of a position of an observer is lower than a given threshold value.

21. The display device according to claim 16,
wherein the control unit is configured to switch display positions of respective viewpoint images at the switching timing in the case where all plural observers can view the images in the orthoscopic area after the switching.

* * * * *